United States Patent [19]

Mietzel

[11] Patent Number: 4,528,902
[45] Date of Patent: Jul. 16, 1985

[54] POD VEGETABLE PROCESSING MACHINE WITH POD DEFLECTING DEVICE

[75] Inventor: Dennis O. Mietzel, Columbus, Wis.

[73] Assignee: Hughes Company, Inc., Columbus, Wis.

[21] Appl. No.: 621,448

[22] Filed: Jun. 18, 1984

[51] Int. Cl.³ .................................... A23N 15/12
[52] U.S. Cl. ............................ 99/636; 99/638; 99/644; 130/30 R; 209/626
[58] Field of Search ............... 99/635–644, 99/546; 366/222, 223, 225, 233; 209/626, 664, 288, 396; 130/30 R

[56] References Cited

U.S. PATENT DOCUMENTS

| | | | |
|---|---|---|---|
| 144,486 | 11/1873 | Toner | 99/603 |
| 1,990,425 | 2/1935 | Buck | |
| 2,393,461 | 1/1946 | Finley | |
| 2,693,834 | 11/1954 | Frova | |
| 3,059,648 | 10/1962 | Burton | 130/30 R |
| 3,405,750 | 10/1968 | Weirauch | 99/640 |
| 3,601,171 | 8/1971 | Farrow | 99/637 |
| 3,645,271 | 2/1972 | Arve et al. | 130/30 R |
| 4,131,062 | 12/1978 | Kumandan | 99/638 |
| 4,213,383 | 7/1980 | Burton | 99/636 |
| 4,361,239 | 11/1982 | Kumandan | 209/626 |

*Primary Examiner*—Timothy F. Simone
*Attorney, Agent, or Firm*—Isaksen, Lathrop, Esch, Hart & Clark

[57] ABSTRACT

A machine for processing pod vegetables including a frame. A generally horizontal outer drum is rotatably mounted on the frame and is adapted to contain the pod vegetables being processed. The outer drum has an inwardly presented working surface adapted to interact with the pod vegetables to process them, the working surface having an ascending side and a descending side as the outer drum rotates. An inner drum is rotatably mounted on the frame, the longitudinal axis of the inner drum being oriented parallel to the longitudinal axis of the outer drum. The inner drum is adapted to rotate in the same direction as and at a higher rate of rotation than the outer drum, the inner drum having an outer surface. Pod vegetables rotating within the outer drum are carried upon the working surface up its ascending side for a selected distance at which point the pod vegetables fall away from the working surface and onto the outer surface of the inner drum, to be propelled by the rotation of the inner drum toward the descending side of the working surface.

22 Claims, 7 Drawing Figures

POD VEGETABLE PROCESSING MACHINE WITH POD DEFLECTING DEVICE

TECHNICAL FIELD

This invention relates generally to drum-type machines for processing pod vegetables and, more specifically to such machines requiring action on the pods by the interior surface of the drum.

BACKGROUND OF THE ART

The large scale processing of pod vegetables forms an important part of the operation of vegetable canneries and similar businesses. Pod vegetables such as beans or peas typically are picked in such a way that many of the pods are still joined by their stems to form clusters. The clusters must be broken up into individual pods, the flower and stem ends of the pods commonly must be snipped off, the pods may be graded for size, and so forth.

Many of the machines that have been developed to perform these operations employ a rotating drum within which the pod vegetables are tumbled. The pod vegetables interact with the interior surfaces of the drum as part of the functioning of the machine. Thus, clusters may be engaged by hooks formed in the drum's inner surface to be drawn past knives that cut the stems of the clusters and separate the individual pods. In snipping machines the ends of the pods commonly are directed outwardly through openings in the inner surface of the drum to project therethrough and be snipped by knives sliding over the exterior surface of the drum. Pods may be graded for size by being seived through openings in the surface of a drum that have a particular size. Commonly such grading machines run more efficiently if the pods are directed toward the openings end first.

Those skilled in the art are generally cognizant of the use of baffles, vanes, and the like to tip a pod so that one of its ends engages the interior surface of a drum. Such vanes typically extend inwardly from the inner surfaces of the drum.

Buck, U.S. Pat. No. 1,990,425; Finley, U.S. Pat. No. 2,393,461; and Burton, U.S. Pat. No. 4,213,383, all are examples of bean snippers of the sort described above in which the end of the bean must project through an opening in the drum to be snipped off by a knife sliding over the outer surface of the drum. Each of these patents show devices contained within the drum adapted to orient beans endwardly toward the inner surface of the drum. In Buck, rods are provided extending the length of the drum that serve to break up any roped mass of beans, allowing the beans to tumble more freely so as to be presented endwardly toward the inner surface of the drum. In Finley, beans in the rotating drum are carried upwardly by the drum and thrown against a vertically corrugated surface so that beans sliding downwardly in the troughs of the corrugation may tend to be endwardly presented to the inner surface of the drum as the beans reach the bottom of the drum.

In Burton, beans are thrown by the rotating drum against an orientor having a plurality of circular disks mounted perpendicularly on a shaft having its axis substantially parallel to the axis of the drum. The disks rotate in the same direction as the drum rotates. Beans falling between the disks are oriented so that the longitudinal axis of each bean lies within a plane perpendicular to the axis of the drum. The openings in the drum of the bean snipper of Burton through which the beans must extend to be snipped are longitudinally extended within like planes, so the beans as they emerge from the orientor at the bottom of the drum are aligned with the openings and have an improved chance of extending therethrough. Although some lesser percentage of the beans encounters the orientor discs at such an angle thereto that they cannot slide between the discs and instead are thrown toward the descending side of the drum to contact the drum structure through a greater arc of its travel, it can be seen that those beans which are so thrown are not oriented by the action of the discs, and those which are oriented are not effectively thrown to the descending side of the drum.

A number of drum-type pod vegetable processing machines have various other devices located within their drums, extending lengthwise therethrough. Examples include Arve, et al., U.S. Pat. No. 3,645,271; Farrow, U.S. Pat. No. 3,601,171; Burton, U.S. Pat. No. 3,059,648; Frova, U.S. Pat. No. 2,693,834; and Toner, U.S. Pat. No. 144,486. These structures serve such functions as pressing pods being processed against the interior of the drum and removing pods or trash. Included in the patents referred to are some machines generally similar to pod vegetable handling machines but in fact designed to process corn or other food materials.

One feature of drum-type pod vegetable processing machines that follows naturally from the principles of their operation is that a considerable portion of the interior surface of the drum is not in contact with the pods at any given instant. Instead, the pods lie in the bottom of the drum to be tumbled or thrown in a manner dictated by the interior features of the drum. Because such a machine works on the pod vegetables by interaction between the pods and the interior surfaces of the drum, attempts have been made to increase the area of the inner surface of the drum that is in contact with the pod vegetables to increase the capacity and efficiency of the machine. Thus, increases in the diameter of the drum make for a broader, flatter area of inner surface capable of contacting the pods. One effect of increasing diameter is that pods carried upwardly by the drum may fall a considerable distance to the floor of the drum, with some increase of bruising and breakage of the pods.

SUMMARY OF THE INVENTION

The present invention is summarized in that a machine for processing pod vegetables includes a frame. A generally horizontal outer drum is rotatably mounted on the frame and is adapted to contain the pod vegetables being processed. The outer drum has an inwardly presented working surface adapted to interact with the pod vegetables to process them, the working surface having an ascending side and a descending side as the outer drum rotates. An inner drum is rotatably mounted on the frame, the longitudinal axis of the inner drum being oriented parallel to the longitudinal axis of the outer drum. The inner drum is adapted to rotate in the same direction as and at a higher rate of rotation than the outer drum, the inner drum having an outer surface. Pod vegetables rotating within the outer drum are carried upon the working surface up its ascending side for a selected distance at which point the pod vegetables fall away from the working surface and onto the outer surface of the inner drum, to be propelled by the rotation of the inner drum toward the descending side of the working surface.

A primary object of the invention is to provide means for orienting pod vegetables so as to more effectively encounter the inner surfaces of a drum-type pod vegetable processing machine.

A second object of the invention is to provide means for increasing the percentage of the inner surfaces of a drum-type pod vegetable processing machine with which the pods are in contact so as to increase the efficiency and capacity of the machine.

A further object of the invention is to provide means for breaking the fall of pod vegetables tumbling within such a machine so as to reduce bruising, breakage, and jamming of the pods.

Yet another object of the invention is to achieve these above objects by means that can be individually and flexibly adjusted so that a single machine may be effectively adjusted to optimal conditions relative to particular drum speeds, fill levels, pod characteristics, and the like.

Other objects and advantages of the invention will be apparent from the following detailed description setting forth the preferred embodiment of the invention.

DETAILED DESCRIPTION OF THE PREFERRED EMBODIMENT

Figure 1:
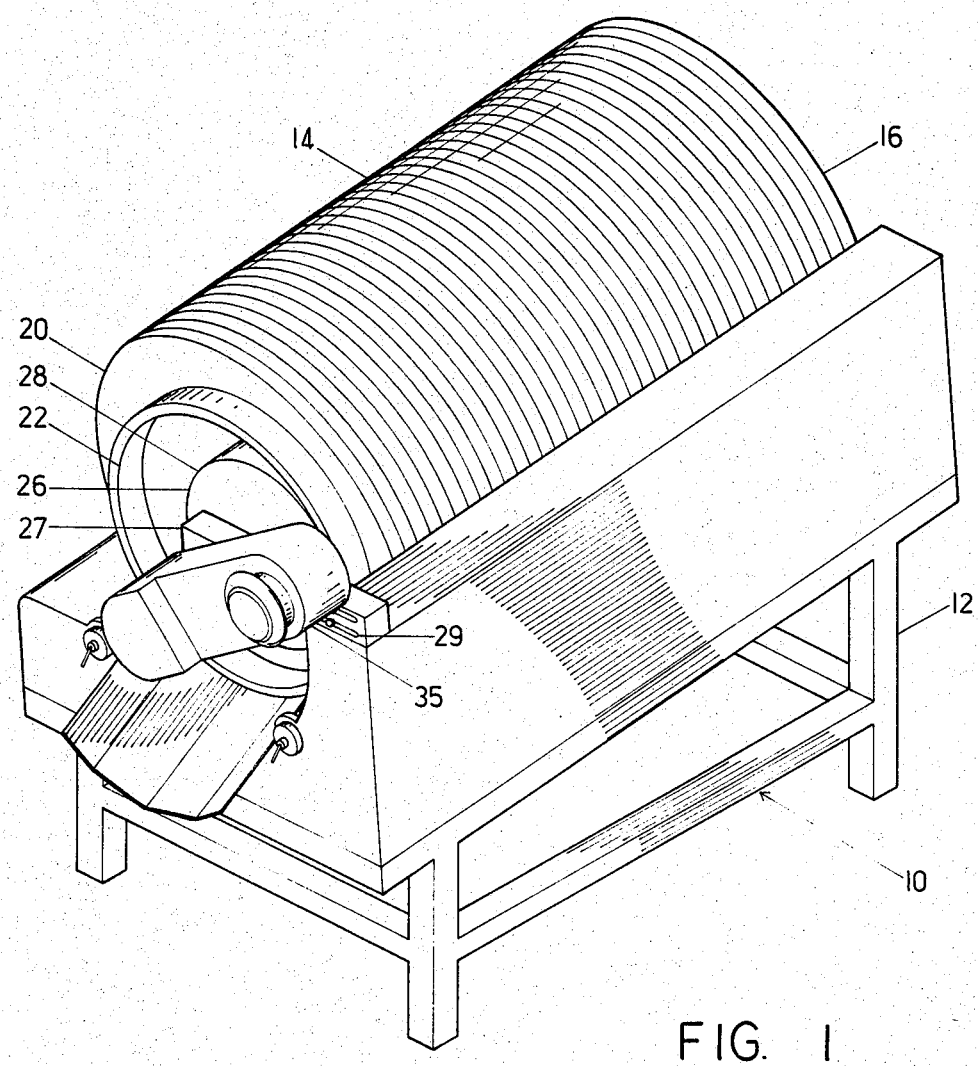
FIG. 1 is a perspective view of a drum-type pod vegetable processing machine viewed from the discharge end thereof.

Referring more particularly to the drawings, wherein like numbers refer to like parts, FIG. 1 shows a drum-type pod vegetable processing machine, generally indicated at 10, constructued in accord with the present invention. The pod vegetable processing machine has a frame 12 and an outer drum 14 extending generally horizontally and mounted on the frame in rotating relation. The outer drum 14 has an intake end 16 having an intake port (not shown) and a discharge end 20 having a discharge port 22. Inner surfaces of the outer drum 14 define a working surface 24 of the outer drum. The working surface 24 is adapted to interact with pod vegetables tumbling in the outer drum to process them. Examples of such working surfaces 24 include inner surfaces containing size grading windows such as those shown in the drum of Kumandan, U.S. Pat. No. 4,361,239; windows through which a portion of the pod is to extend, as in the snipper shown in Weirauch, U.S. Pat. No. 3,405,750; notched partitions used in pod declusterers such as those shown in Kumandan, U.S. Pat. No. 4,131,062; and the like. It will be apparent that, as the outer drum 14 turns, a descending side 23 of the working surface 24 is downwardly moving and an ascending side 25 is upwardly moving.

An inner drum 26 having an outer surface 28 substantially impenetrable by pods and a diameter less than that of the outer drum 14 extends lenghtwise through at least part of the outer drum. The inner drum 26 is rotatably mounted on the frame 12 and so oriented that that its axis is parallel to the axis of the outer drum. Preferably the location of the inner drum 26 within the outer drum 14 may be adjusted to a convenient degree. Thus, the inner drum may be mounted on a support arm 27 that in turn is attached to the frame 12. The support arm 27 may have elongated attachment holes 29 through which bolts 31 may extend to attach the support arm 27 to the frame 12, the elongated attachment holes providing room for positional adjustment of the support arm and the inner drum 21 mounted thereon.

Figure 2:
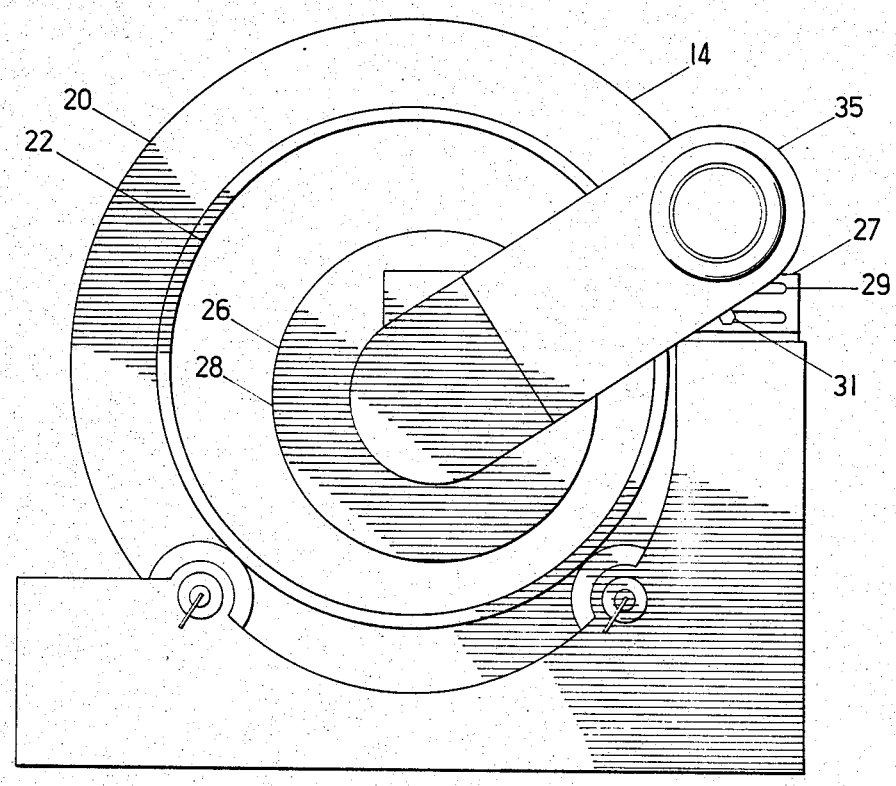
FIG. 2 is an end elevation view of the machine of FIG. 1 from the discharge end thereof, with parts of the frame removed.

The inner and outer drums 26, 14 are adapted to rotate in the same direction, with the rotational rate of the inner drum relative to that of the outer drum preferably being adjustable. The rotational rate of the inner drum preferably is faster than that of the outer drum. It is convenient to drive the inner drum 26 independently of the outer drum 14 by such means as the electric motor and drive belt shown covered by a housing 35 in FIGS. 1 and 2. When pod vegetables have been introduced into the outer drum 14 through the intake port 18, they tend to tumble within the outer drum, interacting with the working surface 24 thereof. The speed of rotation of the outer drum 14 is normally constant, typically being about 22 revolutions per minute for a drum having a diameter of about four feet. The pods are carried up the ascending side 25 of the rotating outer drum by the internal working surfaces 24 of the drum, with excess pods not engaged by the working surfaces 24 tumbling back toward the lowest part of the outer drum in a continuous pattern.

Pod vegetables engaged by the working surfaces 24 typically ride up the ascending side 25 of the outer drum until gravitational forces exceed centrifugal forces, and they fall free of the now inverted working surfaces 24 at some point above the uppermost extension of the inner drum 26. As a consequence, a substantial portion of the pods land on the outer surface 28 of the inner drum 26. Because the inner drum 26 is rotating, pod vegetables so landing on its outer surface 28 are propelled in the direction of the inner drum's rotation. Thus, instead of falling with increasing velocity all the way from the top to the bottom of the outer drum 14, which is traveling in a direction substantially at right angles to the direction of fall, thereby risking considerable damage to the pods, such pods are tossed by the inner drum 26 toward the working surface 24 of the outer drum at points well up on the descending side 23 of the outer drum.

Figure 3:
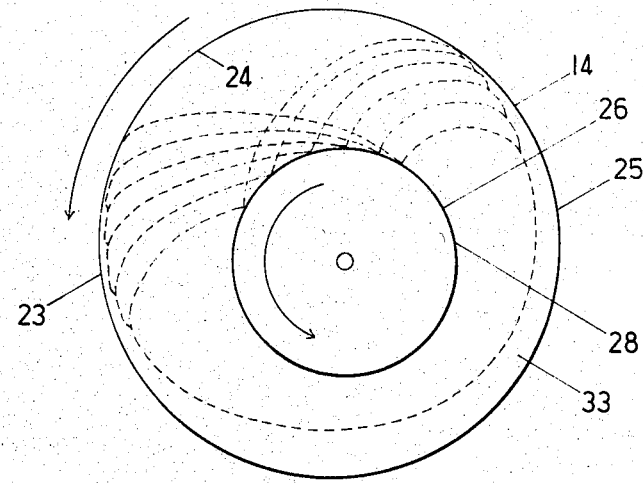
FIG. 3 is a schematic representation of the movement of pods within the machine of FIG. 1.

FIG. 3 is a schematic representation of an inner and outer drum 26, 14, showing a mass of pods 33 being processed therein and the trajectories of pods falling from the outer drum's working surface 24 to the outer surface 28 of the inner drum, and of pods then being tossed toward the working surface at locations well up on the descending side 23 of the outer drum. It is important to note from FIG. 3 that many of the tossed pods are traveling nearly parallel to the working surface 24 as they approach the descending side 23 of the outer drum at a shallow angle thereto, resulting in a very gentle "catch" of the pods by the working surface 24, which substantially minimizes damage to the pods. The speed of the inner drum 26 is preferably adjusted so that the pods are cast toward the descending side 23 of the outer drum to intersect the outer drum at the point at which the descending side 23 is approximately vertical and either side thereof for a short distance to minimize the angle of impingement of the falling pods on the descending working surface.

It can be further seen from FIG. 3 that the inner drum 26 causes the pods to be exposed to parts of the working surface 24 relatively uncovered by other pods, allowing a greater opportunity for interaction between the pods and the working surface. Furthermore, the pods are in contact with the working surface 24 for a greater portion of the circumference of the outer drum 14, also increasing the opportunity for the working surface to interact with the pod vegetables to process them. Typically the inner drum might have a speed of rotation of approximately 80 revolutions per minute.

The outer surface 28 of the inner drum 26 may have any of a number of different, selected characteristics. Thus, the outer surface 28 may be smooth and unfeatured, corrugated or otherwise textured, covered with a soft or non-slip material, or manufactured in other, selected ways, including those disclosed below.

Certain conventional working surfaces 24 of the outer drum 14 of pod vegetable processing machines 10 operate most efficiently on the pods if the longitudinal axes of the pods are aligned parallel to a plane that is oriented at a right angle to the axis of the outer drum 14. FIGS. 4, 5, 6, and 7 show alternative embodiments of the inner drum 26 in which the structure of the outer surface 28 of the inner drum is adapted to orient pods impacting thereon so as to align the longitudinal axes of the pods parallel to a plane extending at a right angle to the longitudinal axis of the outer drum 14.

Figure 4:
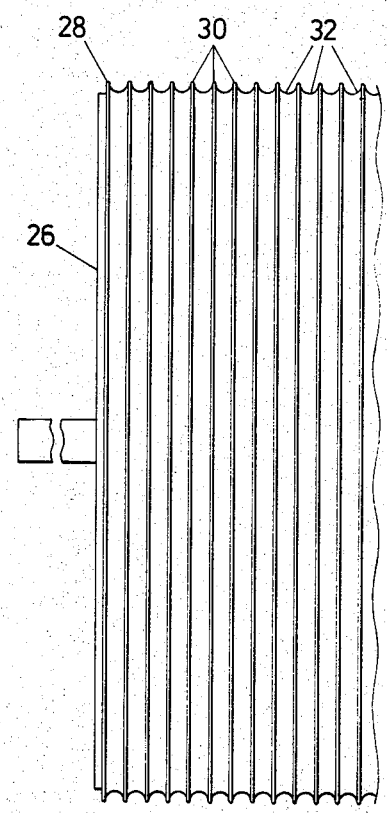
FIG. 4 is a side elevation view of an embodiment of the inner drum of the invention.

In the embodiment shown in FIG. 4, the outer surface 28 of the inner drum 26 includes a multiplicity of spaced, annularly extending ridges 30 separated by valleys 32. The valleys 32 have a width and depth at least generally comparable to the size of a lateral cross section of a pod to be processed. A pod vegetable thrown against this pattern of ridges 30 and valleys 32 tends to be turned by the force of impact to lie within a valley as the pod is propelled by the turning inner drum 26, to be cast against the descending side 23 of the working surface 24 of the outer drum 14. Because the valleys 32 are oriented parallel to typical gauging or snipping windows of the sort discussed above, there is an increased likelihood that a pod oriented by the valley will enter such a window and thus be engaged by the working surfaces 24.

Figure 5:
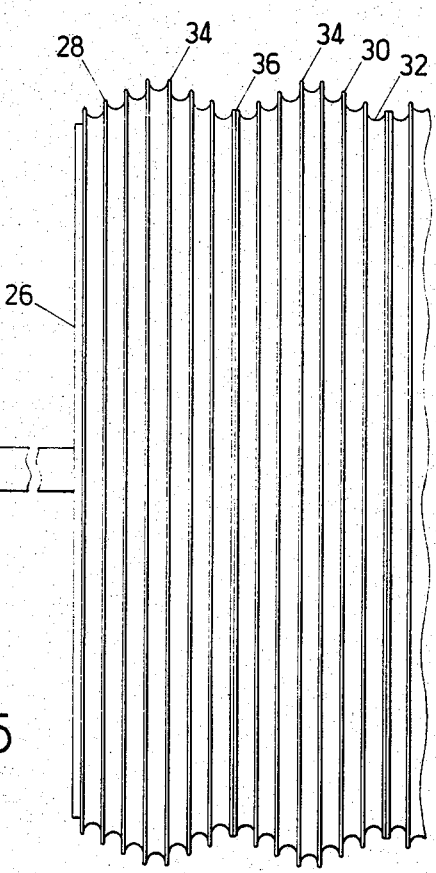
FIG. 5 is a side elevation view of another embodiment of the inner drum of the invention.

The embodiment shown in FIG. 5 is similar to the embodiment of FIG. 4 with ridges and valleys comparable to those of the embodiment of FIG. 4 and given the same reference numbers 30, 32 in FIG. 5. However, in the embodiment of FIG. 5, the ridges 30 extend annularly in periodic, regularly varying degrees such that crests 34 and troughs 36 of groups of ridges 30 and associated valleys 32 of alternating greater and lesser annular extension result. It is believed that pods thrown against the pattern of crests and troughs 34, 36 are first grossly oriented thereby toward an orientation parallel to the valleys 32. This result facilitates the action of the ridges and valleys 30, 32 as described above for the embodiment of FIG. 4.

Figure 7:
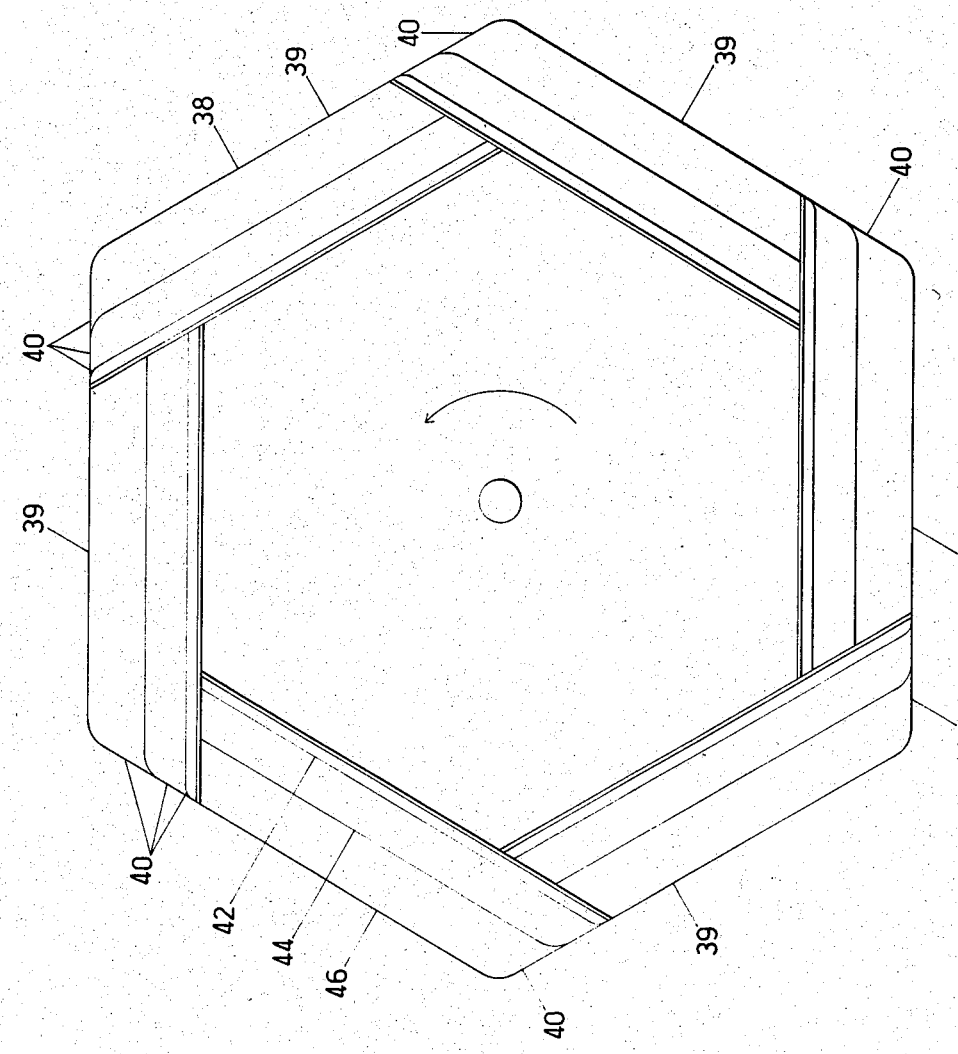
FIG. 7 is an end elevation view of the inner drum of FIG. 6.
Figure 6:
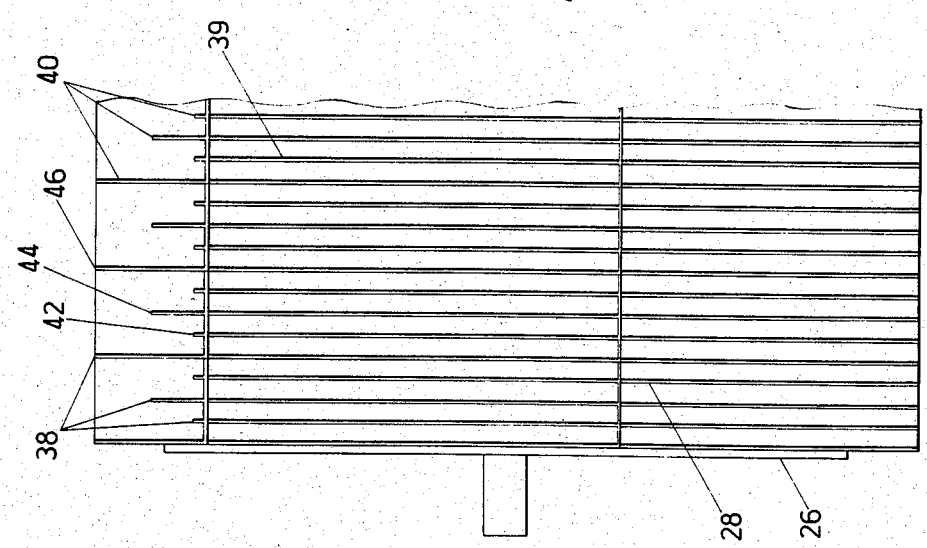
FIG. 6 is a side elevation view of yet another embodiment of the inner drum of the invention.

In the embodiment shown in FIG. 6 and FIG. 7, the outer surface 28 of the inner drum 26 has a plurality of spaced, generally flat vanes preferably lying in planes oriented at a right angle to the longitudinal axis of the inner drum 26 and spaced from each other by a distance at least the width generally of a pod. The vanes 38 preferably are substantially straight and arranged in parallel groups 39 to extend longitudinally in directions tangential to a selected circle concentric with the inner drum 26. Consequently, in this embodiment the inner drum 26, seen from one end as is shown in FIG. 7, defines a straight-sided geometric shape with each side being a group 39 of parallel vanes 38. Alternatively, the vanes 38 may include curved portions. The vanes 38 have ends 40, forwardly presenting with respect to the direction of rotation of the inner drum 26. It will be recalled that the inner drum 26 rotates at a speed greater than that of the outer drum 14 and therefore at a speed greater than that of pods thrown by the outer drum. Consequently, the forwardly presenting ends 40 of the vanes 38 tend to thrust into the shower of pods thrown by the outer drum 14 as the pods fall to the vacinity of the inner drum 26. By this action, pods are forceably oriented parallel to the vanes 38 and by that means are aligned parallel to a plane oriented at a right angle to the longitudinal axis of the outer drum 14. In the preferred embodiment shown in FIGS. 6 and 7, the vanes 38 have differing heights, as may be easily seen in FIG. 6 where vanes of low, middle, and maximum height are identified by the reference numbers 42, 44, and 46, respectively. Pods falling on the vanes 38, either with or without contact with the forwardly presenting ends 40, tend to be tipped endwardly between the vanes 38, resulting in a first approximate orientation leading to a more precise one in a manner comparable to that disclosed above with respect to the crests and troughs 34, 36 of the embodiment of FIG. 5.

It should be understood that, while the action and function of the ridges, valleys, crests, troughs, and vanes of the embodiments of FIGS. 4, 5, 6, and 7 are thought to be as disclosed, the interaction of irregular objects such as pod vegetables with the working surfaces of processing machines frequently is incompletely understood. Therefore, it will be appreciated that the invention is not limited in any way by or to the theoretical account of functions presented above. Instead, the spirit and scope of the invention extends to the invention as claimed below, without reference to any theoretical analysis of the mechanics by which the shapes described and claimed interact with the pod vegetables being processed in the pod vegetable processing machine of the invention.

The various parts of the pod vegetable processing machines 10 of the invention may be made from any suitably rigid material, such as metal or plastics. It is well known to those skilled in the art to make rotating drums mounted on frames generally comparable in that regard to the outer drum 14 and frame 12 of the pod vegetable processing machine 10. Likewise, both rotating and fixed devices extending through the interior of a drum such as the outer drum 14 are known, as is disclosed above, so that the method of making and mounting a structure such as the inner drum 26 is within the scope of ability of one skilled in the art. Working surfaces 24 and the various alternative embodiments of the outer surface 28 disclosed above may be molded whole or in sections from appropriate plastics. It will be observed that the patterns of the ridges, valleys, crests, troughs, and vanes 30, 32, 34, 36, and 38 disclosed above are in repeating patterns that are easily adapted to construction by molding, section by section. Such molded sections may then be fastened to a supportive core, drum, or comparable structure to form the inner drum 26 of the invention.

It is understood that the present invention is not limited to the particular construction and arrangement of parts illustrated and disclosed nor to the particular modes of constructin disclosed herein. Instead, it embraces all such modified forms thereof as come within the scope of the following claims.

What is claimed is:

1. A machine for processing pod vegetables comprising:
   (a) a frame,
   (b) a generally horizontal outer drum rotatably mounted on the frame and including means to contain the pod vegetables being processed, the outer drum having an inwardly presented working surface having means to interact with the pod vegetables to process them, the working surface having an ascending side and a descending side as the outer drum rotates; and
   (c) an inner drum rotatably mounted on the frame, the longitudinal axis of the inner drum being oriented parallel to the longitudinal axis of the outer drum, the inner drum having an outer surface all parts of which are separated by a selected distance from the working surface of the outer drum, the outer surface being substantially impenetrable by pods and being driven to rotate in the same direction as the outer drum;
   whereby pod vegetables rotating within the outer drum are carried upon the working surface up its ascending side for a selected distance at which point the pod vegetables fall away from the working surface and onto the outer surface of the inner drum, to be propelled by the rotation of the inner drum toward the descending side of the working surface.

2. The machine for processing pod vegetables of claim 1 wherein the speed of rotation of the inner drum relative to that of the outer drum may be adjusted.

3. The machine for processing pod vegetables of claim 1 wherein the outer surface of the inner drum is a smooth surface.

4. The machine for processing pod vegetables of claim 1 wherein the outer surface of the inner drum is a non-slip surface.

5. The machine for processing pod vegetables of claim 1 wherein the working surface of the outer drum includes means to interact with pods oriented generally parallel to a plane intersecting the axis of the outer drum at a right angle thereto and the outer surface of the inner drum includes means to act upon pods impinging thereon such that the pods are propelled toward the descending side of the working surface so oriented that their longitudinal axes are generally parallel to a plane that intersects the longitudinal axis of the outer drum at a right angle thereto.

6. The machine for processing pod vegetables of claim 5 wherein the outer surface of the inner drum includes a multiplicity of spaced, annularly extending ridges separated by valleys having a width and depth at least generally comparable to the size of a lateral cross section of a pod to be processed, whereupon a pod thrown against the outer surface tends to be turned parallel to a valley as the pod is propelled by the turning inner drum against the descending side of the working surface of the outer drum.

7. The machine for processing pod vegetables of claim 6 wherein the ridges extend annularly in varying degrees such that crests and troughs of ridges and associated valleys are formed.

8. The machine for processing pod vegetables of claim 5 wherein the outer surface of the inner drum has a plurality of spaced, generally flat vanes lying in planes oriented at a right angle to the longitudinal axis of the inner drum and spaced from each other by a distance at least the width generally of a pod to be processed.

9. The pod vegetable processing machine of claim 8 wherein at least some of the vanes are substantially straight and extend longitudinally in parallel groups in directions tangential to a selected circle concentric with the inner drum, the vanes having forwardly presenting ends adapted to thrust into the pods thrown by the outer drum as the pods fall to the vicinity of the inner drum.

10. The pod vegetable processing machine of claim 9 wherein the vanes have differing heights, including vanes of maximum height interpersed between the other vanes having a lesser height.

11. The pod vegetable processing machine of claim 8 wherein the vanes have differing heights including vanes of maximum height interpersed between the other vanes having a lesser height.

12. An inner drum for use in a machine for processing pod vegetables the machine having a generally horizontal outer drum rotatably mounted and having means to contain the pod vegetables being processed, the inner drum comprising an outer surface substantially inpenetrable by pods and means for rotatably mounting the inner drum within the outer drum so oriented that the longitudinal axis of the inner drum is generally parallel to the longitudinal axis of the outer drum with no part of the inner drum touching the outer drum, the inner drum being driven to rotate in the same direction as the outer drum, whereby pod vegetables contained within the rotating outer drum, carried by it to a point generally above the inner drum, and falling therefrom may fall onto the outer surface of the inner drum, to be propelled by rotation of the inner drum back toward the outer drum.

13. The inner drum of claim 12 adapted to rotate at a higher speed of rotation than the outer drum and including means for adjusting the speed of rotation of the inner drum relative to that of the outer drum.

14. The inner drum of claim 12 wherein the outer surface is a smooth surface.

15. The inner drum of claim 12 wherein the outer surface is a non-slip surface.

16. The inner drum of claim 12 wherein the outer surface includes means to act upon pods impinging thereon such that the pods are propelled back toward the outer drum so oriented that their longitudinal axes are generally parallel to a plane that intersects the longitudinal axis of the outer drum at a right angle thereto.

17. The drum of claim 16 wherein the outer surface includes a multiplicity of spaced, annularly extending ridges separated by valleys having a width and depth at least generally comparable to the size of a lateral cross section of a pod to be processed, whereupon a pod thrown against the outer surface tends to be turned parallel to a valley as the pod is propelled by the turning inner drum back toward the outer drum.

18. The inner drum of claim 17 wherein the ridges extend annularly in varying degrees such that crests and troughs of ridges and associated valleys are formed.

19. The inner drum of claim 16 wherein the outer surface has a plurality of spaced, generally flat vanes lying in planes oriented at a right angle to the longitudinal axis of the inner drum and spaced from each other by a distance at least the width generally of a pod to be processed.

20. The inner drum of claim 19 wherein at least some of the vanes are substantially straight and are arranged in parallel groups that extend longitudinally relative to the inner drum, each such vane extending in a direction tangential to a selected circle concentric with the inner drum, the vanes having forwardly presenting ends adapted to thrust into pods falling into the vicinity of the inner drum.

21. The inner drum of claim 20 wherein the vanes have differing heights, including vanes of maximum height interpersed between other vanes having a lesser height.

22. The inner drum of claim 19 wherein the vanes have differing heights, including vanes of maximum height interpersed between other vanes having a lesser height.

* * * * *